United States Patent
Liu et al.

(10) Patent No.: US 8,139,860 B2
(45) Date of Patent: Mar. 20, 2012

(54) RETRIEVING AND SHARING ELECTRONIC DOCUMENTS USING PAPER

(75) Inventors: Qiong Liu, Milpitas, CA (US); Patrick Chiu, Menlo Park, CA (US); Lynn D. Wilcox, Palo Alto, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 902 days.

(21) Appl. No.: 12/184,124

(22) Filed: Jul. 31, 2008

(65) Prior Publication Data

US 2010/0030778 A1 Feb. 4, 2010

(51) Int. Cl.
G06K 9/34 (2006.01)
(52) U.S. Cl. ...................................................... 382/173
(58) Field of Classification Search .................. 382/118, 382/124, 170, 190, 173–180
See application file for complete search history.

(56) References Cited

U.S. PATENT DOCUMENTS

2007/0071323 A1* 3/2007 Kontsevich et al. .......... 382/190
2009/0169065 A1* 7/2009 Wang et al. .................. 382/118

OTHER PUBLICATIONS

Arya, S., An Optimal Algorithm for Approximate Nearest Neighbor Searching in Fixed Dimensions, Proceedings of the Fifth Annual ACM-SIAM Symposium on Discrete Algorithms, pp. 573-582, 1994.
Mount, D., ANN Programming Manual, 2006, pp. 1-7, http://www.cs.umd.edu/~mount/ANN/Files/1./1./1./ANNmanual_1.1.1.pdf.
Arya, S., Approximate Nearest Neighbor Queries in Fixed Dimensions, In. Proc. 4th ACM-SIAM Symposium on Discrete Algorithms, pp. 271-280, 1993.
Chiu, P., Room with a Rear View, IIIE Multimedia Magazine, pp. 48-54, vol. 7, No. 4, Oct.-Dec. 2000.
Erol, B., Linking Presentation Documents Using Image Analysis, Asilomar Conference on Signals, Systems, and Computers, Pacific Grove, CA, 5 pages, Nov. 9-12, 2003.
Lowe, David G., Distinctive Image Features from Scale Invariant Keypoints, International Journal of Computer Vision, vol. 60, pp. 91-110, 2004.
Liu, Q., On Redirecting Documents with a Mobile Camera, Proceedings of 2006 IEEE 8th Workshop on Multimedia Signal Processing, pp. 467-470, 2006.
Shea, L., Paper Usage and Recycling: How Much Paper do we Waste?, http://www.lisashea.com/lisabase/aboutme/paperusage.html, 2009.
Sproull, R., Refinements to Nearest-Neighbor Searching in k-Dimensional Trees, Algorithmica, 6:579-589, 1991.

* cited by examiner

*Primary Examiner* — Claire X Wang
(74) *Attorney, Agent, or Firm* — Morgan, Lewis & Bockius LLP

(57) ABSTRACT

In an embodiment of the invention, an electronic document (e-document) can be searched and found by capturing an image of the printed document. Instead of typing in a file name or searching through multiple directories, the user simply takes a picture of the document with a camera and the system uses the document image to locate the e-document. In an alternative embodiment of the invention, an image of a printed document can be useful for remote document sharing. In various embodiments of the invention, sharing an image of a printed document can be used to email a high quality paper document, send a high quality fax, or open a document to a page containing an annotation. Through co-design of the feature extraction and search algorithm in the system, the image feature detection robustness and search speed are improved at the same time.

22 Claims, 9 Drawing Sheets

RETRIEVING AND SHARING ELECTRONIC DOCUMENTS USING PAPER

FIELD OF THE INVENTION

The present invention relates to techniques for searching and sharing files.

BACKGROUND OF THE INVENTION

Even though the paperless office was proposed more than ten years ago, paper is still a preferred media in our daily lives. According to L. Shea, "Paper Usage and Recycling: How much Paper do we Waste?" (http://www.lisashea.com/lisa-base/aboutme/paperusage.html last visited May 23, 2008), each person in an office uses on average 2.5 pounds of paper each week, and Americans discard 4 million tons of office paper every year.

DESCRIPTION OF THE RELATED ART

Currently, people use search routines such as the interface shown in FIG. 1 to find the original of a document. With this interface, a person needs to explore various directories and files. To reduce the need to explore directories and file names to find an electronic document (e-document), many office workers turn to a search interface that searches based on an input search string, such as that shown in FIG. 2. While, these interfaces will return documents if the search term is present in the name or content of the file, they will typically also return many more 'non-relevant' files, requiring the user to sort through the list of files found.

There are related methods to retrieve a document using an image of the document. Chiu et al. retrieved documents based on matching DCT coefficients (P. Chiu, A. Kapuskar, S. Reitmeier, and L. Wilcox, "Room with a Rear View: Meeting Capture in a Multimedia Conference Room", IEEE Multimedia Magazine, pp. 48-54, vol. 7, no. 4, October-December 2000). Erol et al. find documents in an image based on OCR results and line profiles (B. Erol, and J. J. Hull, "Linking Presentation Documents Using Image Analysis", Asilomar Conference on Signals, Systems, and Computers, Pacific Grove, Calif.). Liu et al. use Scale Invariant Feature Transform (SIFT) to identify an e-document based on a displayed document (Q. Liu, D. Kimber, P. Chiu, P. McEvoy, and H. Zhou, "On Redirecting Documents with a Mobile Camera", in Proceeding of 2006 IEEE $8^{th}$ workshop on Multimedia Signal Processing, Victoria, BC, Canada).

SUMMARY OF THE INVENTION

In an embodiment of the invention, an e-document can be searched and found using a photo or other image of the printed document. In an embodiment of the invention, a user can find an e-document by using a digital camera, including a cell phone with a low resolution digital camera, and sending the image to a computer. Instead of typing in a file name or searching through multiple directories, the system uses the document image to locate the e-document. This kind of interface can save a user from searching through directories or from typing keywords and looking through the list of retrieved e-documents. In addition to use in regular desktop systems, this interface is also applicable for retrieving documents using personal digital assistants (PDA)'s or cell phones, where either the display or the keyboard size make displaying, sorting or typing challenging tasks.

The e-document photo based search is also useful for enhanced sharing of documents between remote collaborators, when regular teleconference cameras have insufficient resolution to capture a clear document image. In an embodiment of the invention, during a teleconference it can be realized that it is desirable to share a paper document between collaborators. When the teleconference camera does not provide enough resolution for document sharing, the document image can be used by the teleconference participants to find the location of the e-document. By taking a low resolution picture of the document, the image can be used to search for the e-document. The location of the e-document once found can then be shared with the collaborators so that each can access the document and sent it to a remote screen or printer so that each participant can have a copy of the document.

In another embodiment of the invention, sharing an image of a printed document can be used to email a high quality paper document, send a high quality facsimile (fax), or open a document to a page containing an annotation. In the above example, instead of the location of the e-document being shared, the document itself can be accessed by one collaborator and sent via email or electronic fax (e-fax) so that each participant can have a copy of the document.

In various embodiments of the invention, through co-design of the feature extraction and search algorithm in the system, the image feature detection robustness and search speed can be improved.

BRIEF DESCRIPTION OF THE DRAWINGS

Preferred embodiments of the present invention will be described in detail based on the following figures, wherein.

DETAILED DESCRIPTION OF THE INVENTION

With piles of paper documents to be reviewed, finding documents is difficult. Finding original e-files can similarly be difficult. The interface shown in FIG. 1 works well when a user can remember the various directory names and file names. However, as the number of directories and files increases, this interface is tedious and time consuming. A search interface, as shown in FIG. 2, can save effort by restricting the search to files retrieved by user specified keywords. However, users must type in the appropriate keywords and there is no guarantee that the desired e-document will be uniquely specified.

The Chiu approach, based on matching Discrete Cosine Transform (DCT) coefficients, also has limitations in as much as the document must occupy a large area in the image, or the document area in the image must be identified by a segmentation algorithm (P. Chiu, A. Kapuskar, S. Reitmeier, and L. Wilcox, "Room with a Rear View: Meeting Capture in a Multimedia Conference Room", IEEE Multimedia Magazine, pp. 48-54, vol. 7, no. 4, October-December 2000). These requirements make it difficult to find documents captured at random locations in an image. When several different documents are presented in the given image at the same time, the approach becomes more problematic unless good document segmentation can be achieved.

The Erol approach, based on Optical Character Recognition (OCR) results and line profiles, requires a high resolution image for OCR (B. Erol, and J. J. Hull, "Linking Presentation Documents Using Image Analysis", Asilomar Conference on Signals, Systems, and Computers, Pacific Grove, Calif.). OCR does not work when several documents are presented in the same image. Moreover, the Erol approach does not work well with non-text images.

Further, if text is used then the approach can also use language knowledge to assist the search. While there are advantages with this approach, to make the algorithm work, a high resolution camera is required to capture characters clearly for OCR. This high resolution camera requirement makes it difficult to deploy the system for ordinary users. Moreover, when the document has very few words in it or the document is written in a foreign language not covered by the OCR package, then the text search algorithm becomes a liability.

The Liu approach works well for retrieval from a small collection of documents (Q. Liu, D. Kimber, P. Chiu, P. McEvoy, and H. Zhou, "On Redirecting Documents with a Mobile Camera", in Proceeding of 2006 IEEE $8^{th}$ workshop on Multimedia Signal Processing, Victoria, BC, Canada). However, because the image feature dimension is high (128 dimension), it is not very practical to use this algorithm for large document collections. In addition, the image patch for extracting the 128 dimension is large, and is thus prone to global noise interference and perspective distortions caused by cameras.

Figure 1:
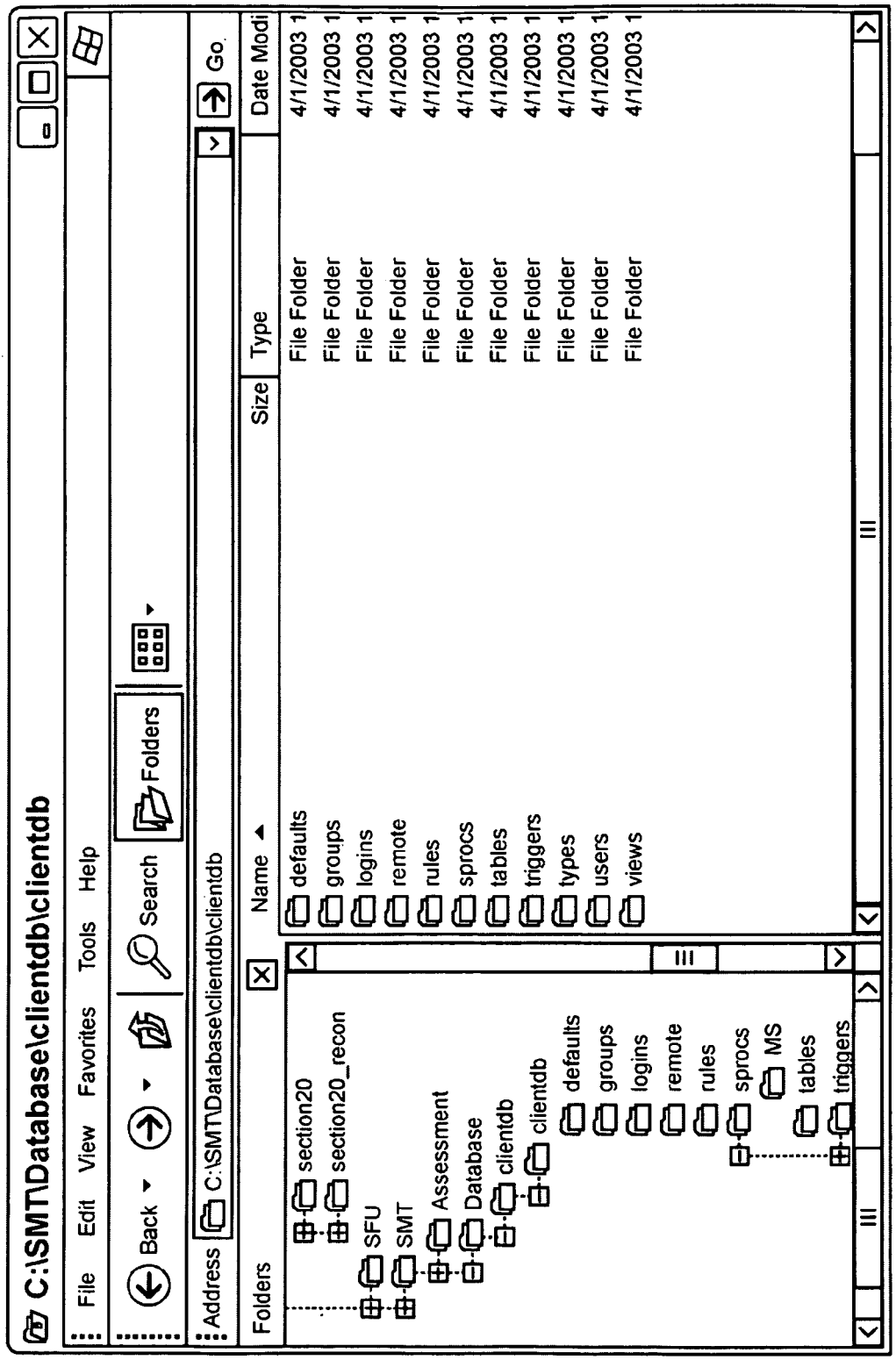
FIG. 1 shows an existing interface that can be used to search for files.
Figure 2:
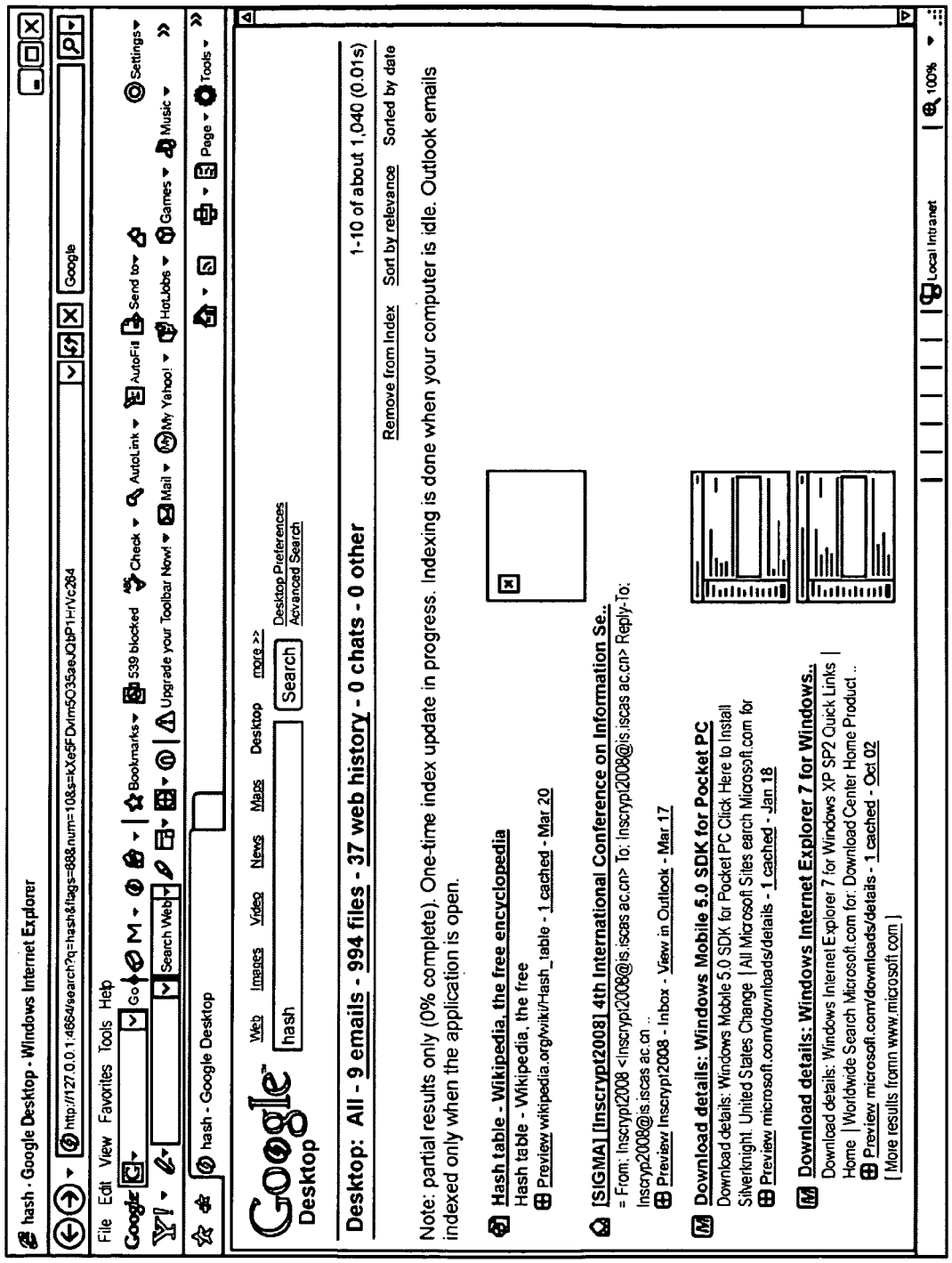
FIG. 2 shows an existing web based interface that can be used to search for documents based on a search string.

The limitations of the Chiu, Erol and Liu approaches as well as difficulties with more general search interfaces such as those shown in FIGS. 1 and 2 are addressed in various embodiments of the invention.

There are several challenges in building a search, retrieval and sharing system. First, robust features can be required to represent the captured document under a variety of camera and capture conditions. Second, a fast search algorithm able to rapidly deal with a large number of documents can be required. Third, a language independent algorithm able to retrieve arbitrary documents and support global collaborations can also be required.

In an embodiment of the invention, low level image features can be used to overcome the language problem. Additionally, co-design of the feature extraction and search algorithm can improve feature robustness and search speed at the same time.

In an embodiment of the invention, a document can be searched from a library or repository of documents such as the contents of a hard drive including the steps of obtaining an image of the document, generating a plurality of descriptors based on the image, generating a plurality of local sub-descriptors based on each descriptor, finding the k nearest neighbors of each sub-descriptor, assigning a label to each sub-descriptor of each descriptor based on the closest k nearest neighbors of each sub-descriptor, assigning a final label based on the most frequent label of sub-descriptors and retrieving the document based on the final label assignment.

System Overview

Figure 3:
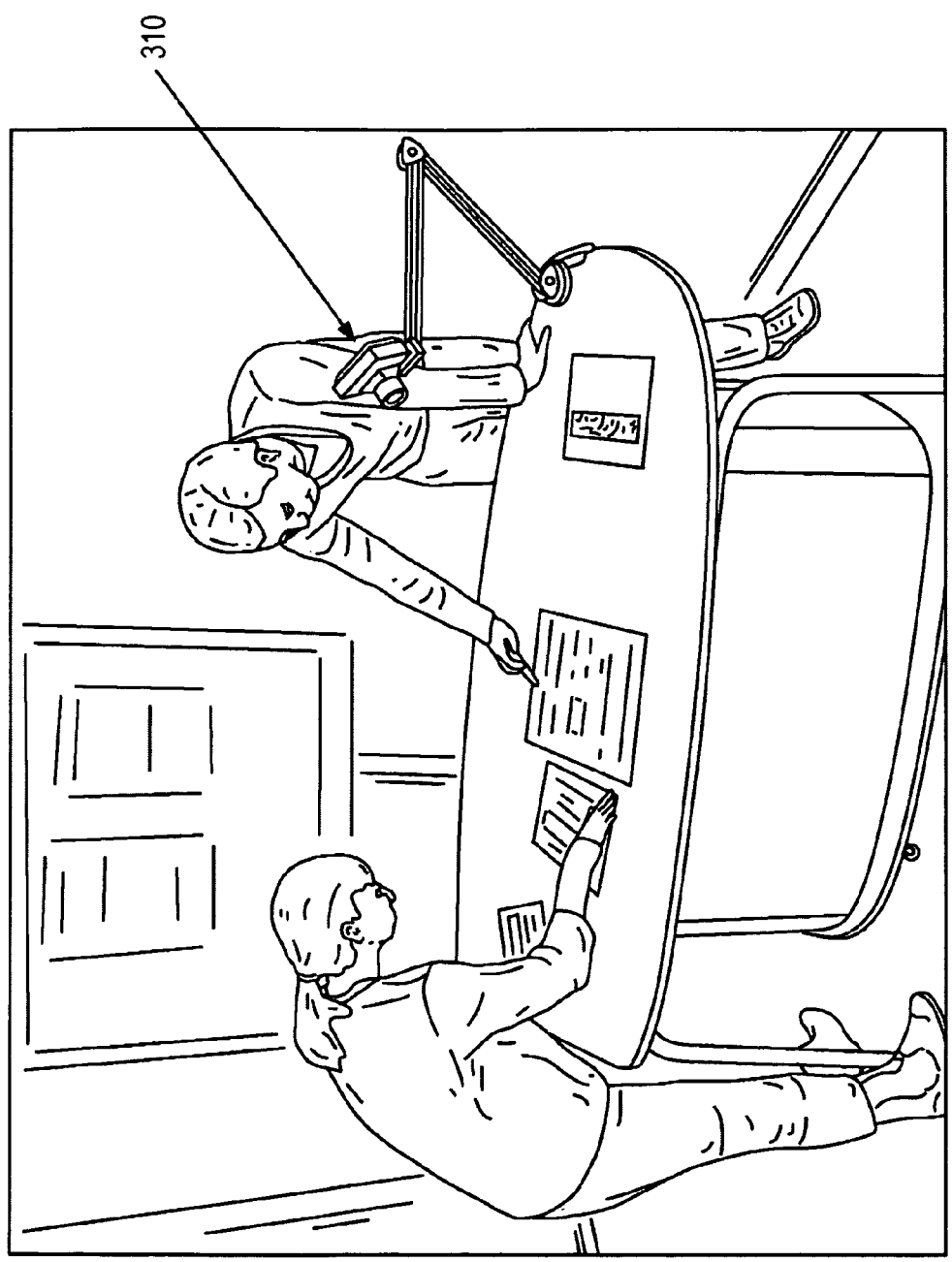
FIG. 3 shows one electronic desktop (e-desktop) with a camera mounted above the e-desktop to capture images.

In order to make the system work for programmable cameras (e.g. camera-equipped cell phones) and non-programmable cameras (e.g. cameras directly connected to a PC, see FIG. 3), the software can be separated into three modules: mobile-client module, service-proxy module, and document-manipulation module.

The mobile-client module is a client application that is used to capture document images from a camera. If the camera is installed on a cell phone, this application will be deployed on the cell phone itself. If the camera 310 is connected to a teleconference system (see FIG. 3) or a server PC, the software module will be deployed on the PC connected to the camera. By separating this module from the main system, scaling up the system to handle multiple cameras can be facilitated.

The service-proxy module provides a web service for various cameras to talk to the document-manipulation module. More specifically, the service-proxy module analyzes the captured image, extracts low level image features, and searches for the original e-document matching these extracted features. In an embodiment of the invention, different proxy services are provided for different document systems with the same hardware.

The document manipulation module is a service application module that has the authority to access the original e-documents. It can reside on the machine that has access to the document repositories. In order to assist the deployment of this service, the document manipulation module can be started directly from a web site.

Feature Extraction and Search

In an embodiment of the invention, the Scale Invariant Feature Transform (SIFT) approach and k-dimensional (kd) trees can be modified for improving search robustness and search speed.

SIFT Features

The Scale Invariant Feature Transform (SIFT) proposed by Lowe are a set of features that are invariant to image scale and rotation (D. G. Lowe, "Distinctive image features from scale-invariant keypoints", International Journal on Computer Vision, vol. 60, pp. 91-110, 2004). Compared with global features, a SIFT descriptor is a local feature that provides better description of a certain location in the spatial domain. Because its feature collection area is smaller than the whole image, the feature set can avoid interferences caused by occlusion, local illumination change, background interferences, and localized image noise. Moreover the smaller sampling area makes the SIFT features more robust to perspective transform.

According to Lowe, each SIFT descriptor has 128 dimensions (D. G. Lowe, "Distinctive image features from scale-invariant keypoints", International Journal on Computer Vision, vol. 60, pp. 91-110, 2004). Based on the feature extraction description, the minimum sampling region for a descriptor is 16 by 16 pixels. The high dimensionality and large sampling space give SIFT features both strengths and weaknesses. With 128 dimensions, a SIFT descriptor is a very distinctive feature descriptor. However, the high dimensionality of SIFT descriptors make the subsequent search difficult. Even though Lowe suggests the Best-Bin-First (BBF) algorithm for fast searches, the BBF only claims good performance for moderate dimensionality (e.g. 8-15). In addition, the 16 by 16 sampling area is more sensitive to occlusion and localized noise than a smaller sampling area.

In an embodiment of the invention, a document can be searched from a library or repository of documents such as the contents of a hard drive including the steps of obtaining an image of the document, generating a plurality of SIFT image-features based on the image, generating a plurality of local sub-features based on each SIFT image-features, finding the k-approximate-nearest-neighbors of each sub-feature, assigning a label to each local sub-feature of each SIFT image-feature based on the closest k nearest neighbors of each local sub-feature, assigning a final label based on the most frequent label of local sub-features and retrieving the document based on the final label assignment.

kd-Trees

A kd-tree is a space-partitioning data structure for organizing points in a k-dimensional space. kd-trees are a useful data structure for several applications, such as searches involving a multidimensional search key (e.g. range searches and nearest neighbor searches). kd-trees are a special case of Binary Space Partitioning (BSP) trees. A kd-tree uses only splitting planes that are perpendicular to one of the coordinate system axes. This differs from BSP trees, in which arbitrary splitting planes can be used. In addition, every node of a kd-tree, from the root to the leaves, stores a point. This differs from BSP trees, in which leaves are typically the only nodes that contain points or other geometric primitives.

Difficulty of Employing kd-Trees

For uniformly distributed 'n' points, the expected space and query time complexity of a kd-tree are O(n) and O(log n) respectively. This expected computational complexity is much better than the computational complexity of brutal force search O(d*n), where 'd' is the dimension of a data point. This is the strength of using a kd-tree to search for data. However, when data points have a non-uniform distribution, the kd-tree computational complexity increases quite rapidly with dimension (see, Sproull, R. L. 1991. "Re_nements to nearest-neighbor searching". *Algorithmica* 6, 579-589). According to Arya et al., the kd-tree computational complexity constant factor hidden in the asymptotic running time grows at least as fast as $2^d$, and if the number of data points n is not significantly larger than $2^d$, the boundary effects only mildly decrease the exponential dimensional dependence (S. Arya, D. M. Mount, N. S. Netanyahu, R. Silverman and A. Wu, "An optimal algorithm for approximate nearest neighbor searching", *Journal of the ACM,* 45(6):891-923, 1998). This complexity change in high dimensional space makes it difficult to use SIFT features with a large image collection.

In an embodiment of the invention, a document can be searched from a library or repository of documents such as the contents of a hard drive including the steps of obtaining an image of the document, generating a plurality of descriptors based on the image, generating a plurality of local sub-descriptors based on each descriptor, building a kd-tree for each of the plurality of sub-descriptors, assigning a label to each sub-descriptor of each descriptor based on the most frequent label of each sub-descriptor, assigning a final label based on the most frequent sub-descriptor label and retrieving the document based on the final label assignment.

SIFT Feature Matching Strategy

The original SIFT feature and matching strategy design are focused on identifying each individual matching point. In order to reduce mismatches, it is very important to improve the descriptor distinctiveness. In various embodiments of the invention, the goal can be to correctly recognize a document. In some embodiments of the invention, point mismatches can be tolerated as long as the final goal is not affected.

According to Lowe, the matching point is identified according to the distance ratio of the closest point and the second closest point (D. G. Lowe, "Distinctive image features from scale-invariant keypoints", International Journal on Computer Vision, vol. 60, pp. 91-110, 2004). The 'Lowe' matching strategy requires exact nearest neighbor search of the closest and second closest points. According to Mount, existing exact nearest neighbor search algorithms are often not significantly better than brute-force search, except in fairly low dimensions (see D. M. Mount, "ANN Programming Manual" http://www.cs.umd.edu/~mount/ANN/Files/1.1.1/ANN manual_1.1.1.pdf).

Approximate Nearest Neighbor Algorithm

However, if a user is willing to tolerate a small amount of error in the search, it is possible to achieve significant improvements in running time (see S. Arya, D. M. Mount. "Approximate nearest neighbor queries in fixed dimensions", In Proc. $4^{th}$ ACM-SIAM Symposium on Discrete Algorithms, pages 271-280, 1993). Thus, changing the SIFT feature matching strategy can reduce the overall document recognition time.

SIFT Sub-Features and kd Tree Forest

Figure 4A:
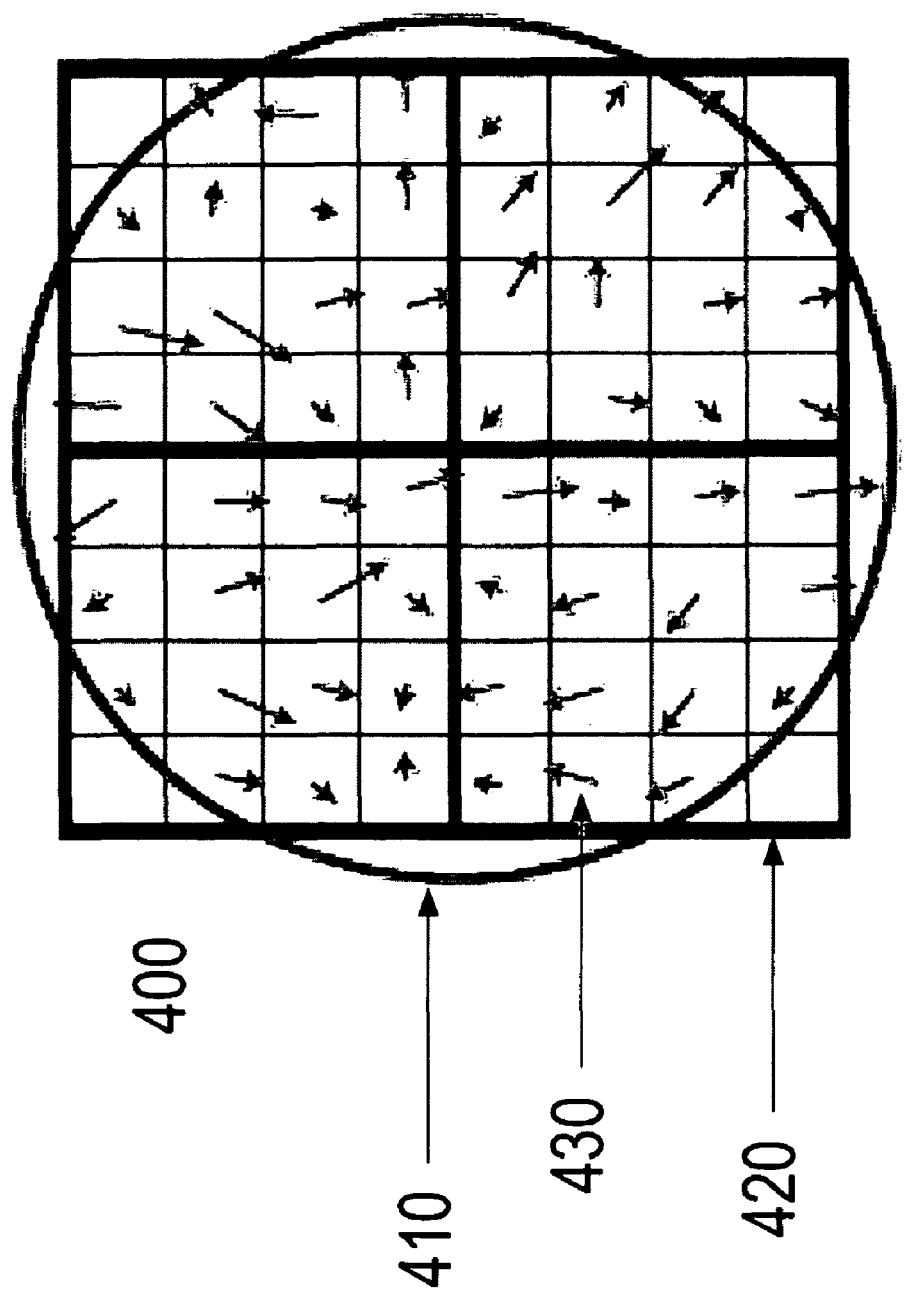
FIGS. 4A and 4B illustrate embodiments of the invention that separate each complete descriptor into four sub-descriptors.

In order to overcome problems of SIFT features and kd-trees, each SIFT feature can be separated into multiple sub-features. A kd-tree can be built for each low dimensional sub-feature. The matching criteria can also be changed to k-nearest-neighbor voting. In this way, a kd-tree forest of sub-features can be obtained. To fuse the result generated by each sub-feature kd-tree, each sub-feature kd-tree matching is assigned 'k' votes for the final result of the forest. FIG. 4A is adapted from Lowe and illustrates how a portion of an image 400 constituting a descriptor (is made up of an 8×8 matrix) 420, where the gradient magnitude and orientation at each sample point in the 8×8 matrix is shown by an arrow 430. The arrows contributing to the descriptor are weighted by a Gaussian window 410.

Figure 4B:
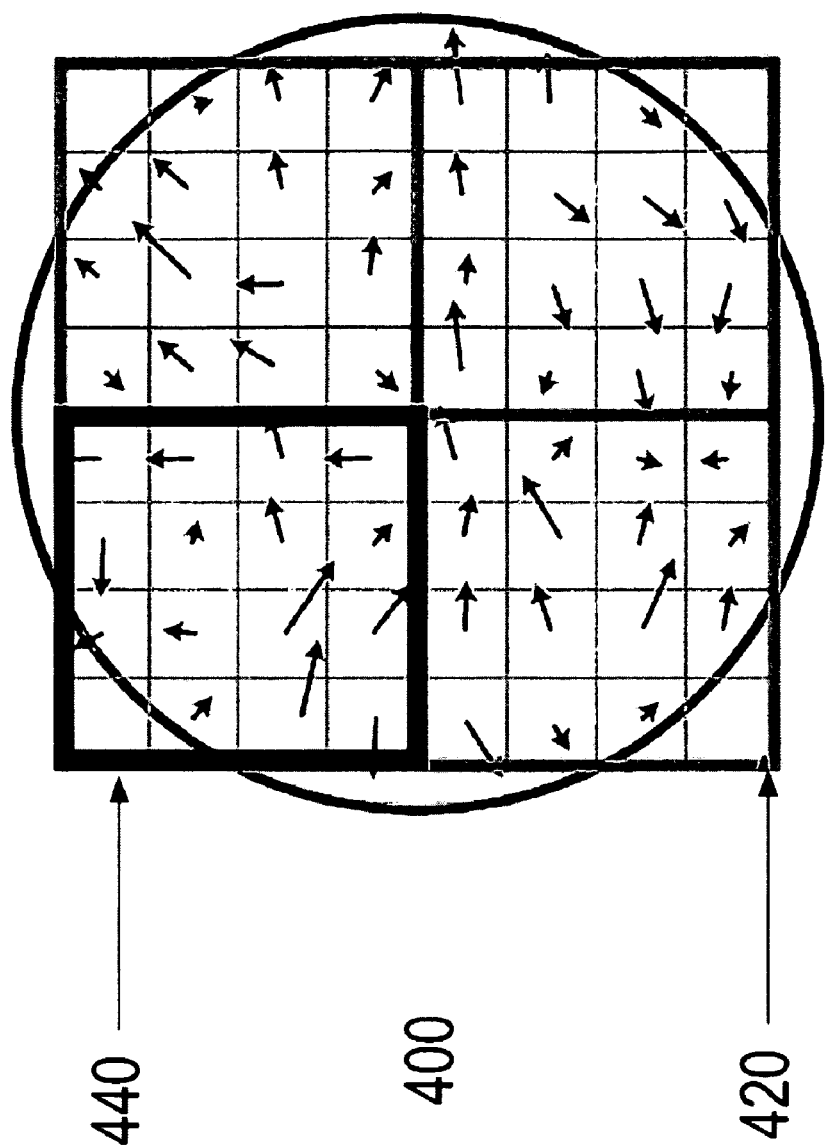

By using SIFT sub-features and the kd-tree forest, the problems caused by increased dimensionality can be overcome. Moreover, because the sub-features are more localized than the full features and the decision is made through voting, the sub-features are more immune to occlusion and other localized noise interference. FIG. 4B illustrates an embodiment of the invention that separates each feature 420 of the image 400 into four sub-features 440. The cost introduced by sub-features is more mismatches. If mismatches are uniformly distributed across the feature space, the document search false alarm caused by mismatches can be offset by the kd-tree voting process. Even though the confidence level of each sub-feature match is lower than full feature match, the confidence level can have little negative impact on the actual document search. Additionally, each sub-feature can be assigned to one of the sub-feature kd-trees according to the sub-feature location in the complete feature. As a result, part of the sub-feature relation constraints for reducing mismatches can also be preserved.

In an embodiment of the invention, a document can be searched from a library or repository of documents such as the contents of a hard drive including the steps of obtaining an image of the document, generating a plurality of SIFT image-features based on the image, generating a plurality of local sub-features based on each SIFT image-feature, building a kd-tree for each of the plurality of local sub-features, assigning a label to each local sub-feature of each SIFT image-feature based on the most frequent label of each local sub-feature, assigning a final label based on the most frequent local sub-feature label and retrieving the document based on the final label assignment.

In an embodiment of the invention, a document can be searched from a library or repository of documents such as the contents of a hard drive including the steps of obtaining an image of the document, generating a plurality of SIFT 128 dimension image-features based on the image, generating four (4) thirty two (32) dimension local sub-features based on each SIFT 128 dimension image-feature, building a kd-tree for each of the plurality of local sub-features, assigning a label to each local sub-feature of each SIFT image-feature based on the most frequent label of each local sub-feature, assigning a final label based on the most frequent sub-feature label and retrieving the document based on the final label assignment.

Figure 5:
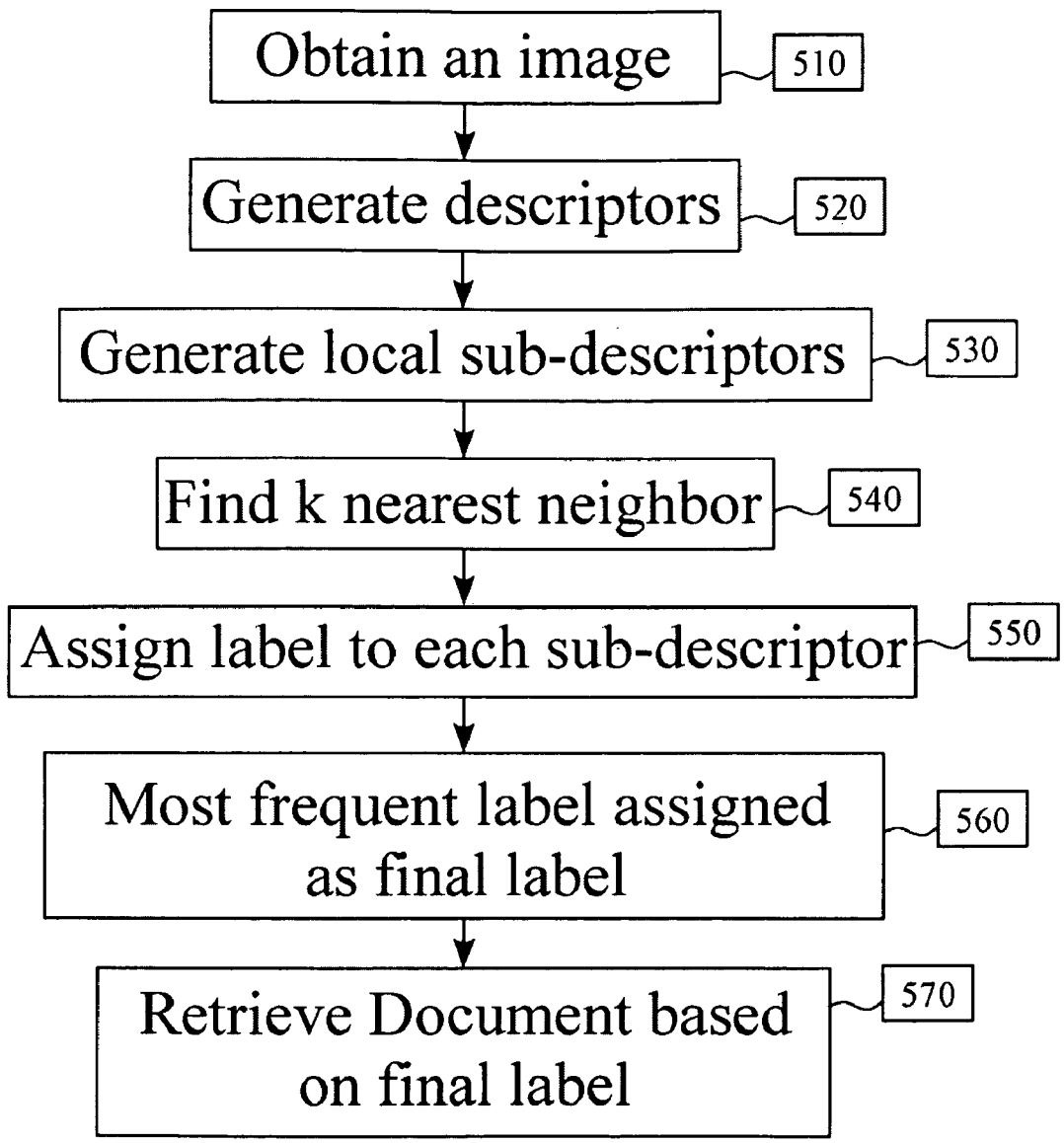
FIG. 5 shows a block diagram of the general steps involved in searching and identifying an e-document according to an embodiment of the invention.

FIG. 5 is a block diagram illustrating the general steps involved in searching for an e-document according to an embodiment of the invention. Once the image of the document is obtained 510, full descriptors are generated 520 and based on the full descriptors local sub-descriptors 530 are generated. Next, the 'k' nearest neighbors of each local sub-descriptor are determined 540 and the most frequent label of these 'k' nearest neighbors is assigned as a label for each local sub-descriptor 550. The most frequent label of all sub-descriptors is assigned as the final label 560. This final label is used to retrieve the e-document 570.

Figure 6:
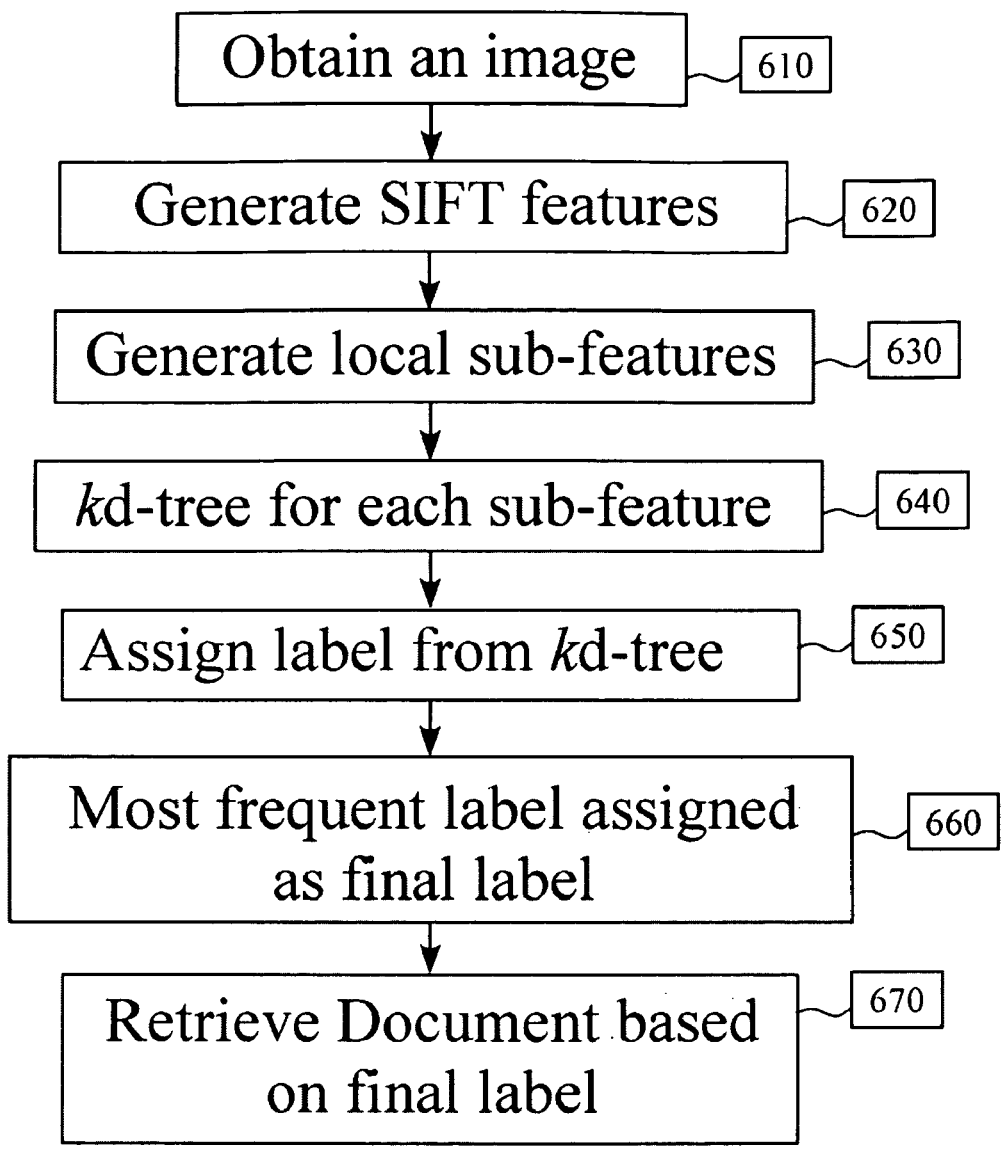
FIG. 6 shows a block diagram of the steps involved in searching and identifying an e-document using SIFT descriptors and a kd tree according to an embodiment of the invention.

FIG. 6 is a block diagram illustrating the steps involved in searching and identifying an e-document using SIFT descriptors and a kd tree according to an embodiment of the invention. Once the image of the document is obtained 610, a plurality of SIFT image-features are generated 620. Based on the SIFT image-features a plurality of local sub-features is generated 630. For each local sub-feature a kd tree can be generated 640. A label is assigned to each sub-feature based on kd-tree search results 650. The most frequent label of all sub-features is chosen as the final label 660. This final label is used to retrieve the e-document 670.

In an embodiment of the invention, users have the freedom of using an object of interest (OOI) image captured at any viewing angle and using one or more images for document retrieval. Further, users can use more OOI images from different angles for better object recognition when one image is not enough. This approach does not force users to use multiple images. It is natural for normal users. It is also more flexible when the OOI is difficult to remove from a certain background.

Two similar local features can have quite different locations in two different images. If we cannot find these two different locations for these two features, it is hard for the algorithm to compare these two features. In an embodiment of the invention, an anchor point is used to find these two different locations for these two features. An anchor point (a position on an image) acts as a means for localizing a local feature.

In various embodiments of the invention, a hardcopy of a document can be scanned and the PDF (or other image of the photograph) can be broken into descriptors to find the digital version of the same document. For example, a hardcopy photograph can be scanned and the PDF (or other image of the photograph) can be broken into descriptors to find the digital version of the same photograph. Alternatively, a hardcopy of a word document or a hardcopy of a PowerPoint document can be used to retrieve the electronic version of the document.

EXAMPLE I

In an embodiment of the invention, a collaboration through two e-desktops (one of which is shown in FIG. 4) can be possible at two different locations. When a paper document is placed at a first e-desktop, it is desirable that a user at the second desktop can see a duplicate of the document on the second e-desktop. The camera mounted on the edge of the first e-desktop, can be used to capture the paper document placed on the table. Because the paper document can be put at any place on the table, the document image captured by the camera can be distorted. Moreover, with existing camera hardware, the captured document can be blurred due to movement or low camera resolution. In an embodiment of the invention, a copy of an image of the document can be sent to the second e-desktop which can then retrieve the low resolution image and search the database of the first e-desktop (or a common database) to retrieve the original document. Once retrieved the high resolution document on the second e-desktop can be shown.

EXAMPLE II

In an embodiment of the invention, to edit a paper document a low resolution image of the paper document is captured and used to find and open the original e-document. Once opened, the text or Figures in the document can be edited.

EXAMPLE III

In an embodiment of the invention, to email a paper document the paper document is scanned with a Multi Function Device (MFD) and sent to the recipient who can then search and retrieve the original e-document corresponding to the scanned image. Thus the low resolution image obtained with the MFD serves as a surrogate link to the e-document.

EXAMPLE IV

In an embodiment of the invention, as an alternative to faxing a document a paper document can be scanned with a MFD and the low resolution scan sent to the intended fax recipient, who can then search and retrieve the original e-document corresponding to the scanned image. Thus the low resolution image serves as a surrogate fax of the e-document, albeit delivering a higher quality paper document without scanning or fax transmission noise.

EXAMPLE V

In an embodiment of the invention, a mobile worker with a cell phone can share a paper document with the home office. For example, an executive reads a paper document in an airport and wants to make some changes. The executive can send his secretary an image of the page that he wants to modify. The low resolution cell phone image can be used to retrieve the original document and bring it up to the secretary's desktop. In an embodiment of the invention, a specific location on the document can also be transferred. A cross at the center of the cell phone screen can be recorded relative to the paper document location. The recorded centre point location can then be transmitted to the secretary to assist in finding a specific location for modification.

EXAMPLE VI

In an embodiment of the invention, highlighted regions annotated in the paper document can be shown on the electronic document. As explained in the above examples an image can be used to find an original e-document corresponding to an annotated paper document. By comparing the image of the paper document with original electronic document, annotated regions and highlighted regions can be found and the same annotations introduced into the e-document.

EXAMPLE VII

Figure 7A:
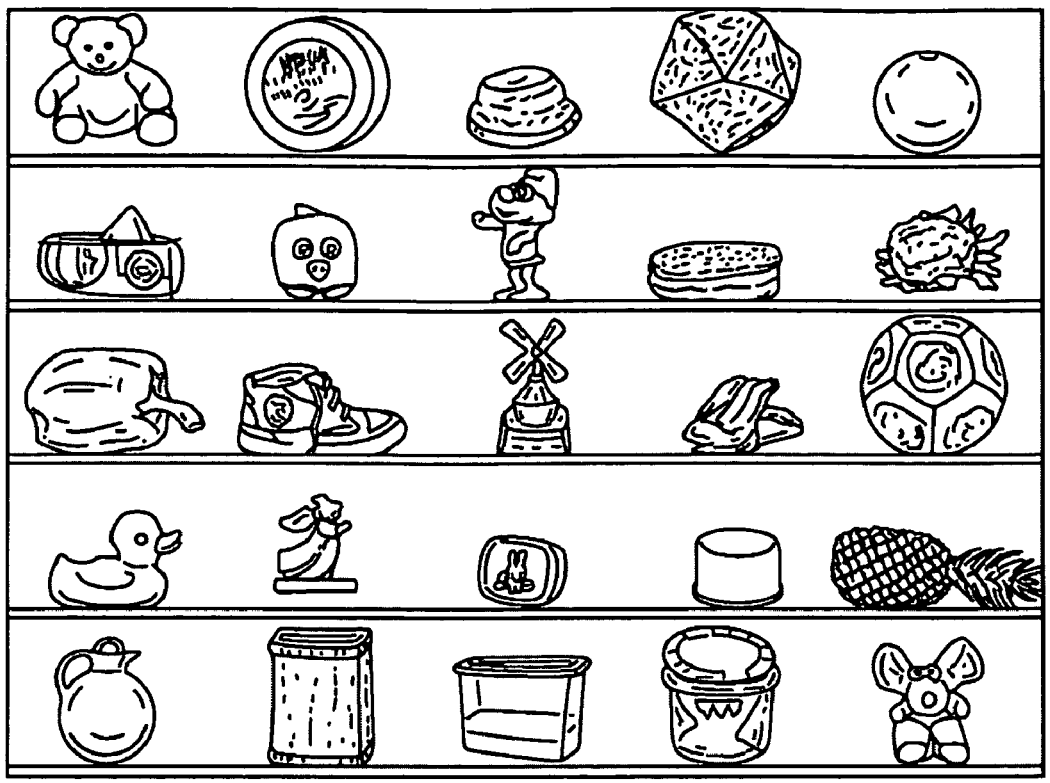
FIGS. 7A and B show small object images from the Amsterdam Library of Object Images (ALOI) library.
Figure 7B:
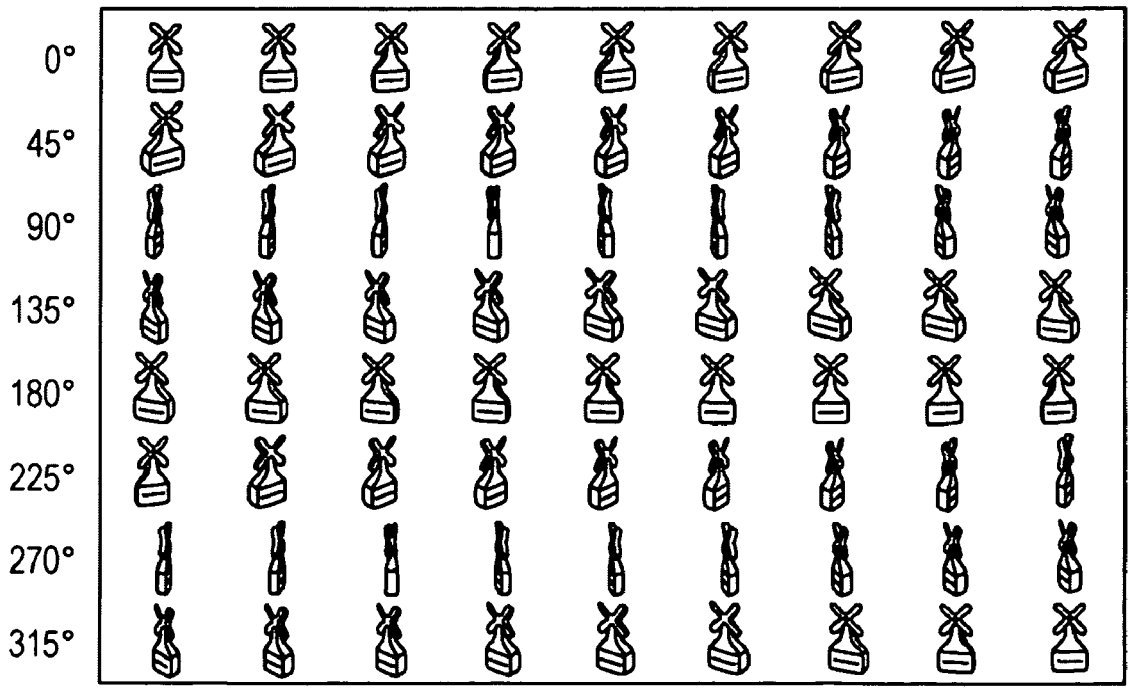

In an embodiment of the invention, a modified algorithm was tested with 1000 small objects in the ALOI (Amsterdam Library of Object Images) library. FIG. 7A showed some small objects collected in this library. FIG. 7B showed some photos that the library has for each object. Because the library collects images of an object at 5 degree intervals, this library is attractive to generate training data and testing embodiments of the invention at many different viewing angles.

A search to retrieve an e-document of an object from the ALOI library using a normal SIFT feature and a one kd tree (a one kd-tree is the data structure for nearest neighbor search where each node includes a data point in data space and its corresponding label. A Kd-tree can be used to speed up the SIFT search of Lowe et al.) was compared with an object search with the proposed sub-SIFT features and 4 sub-feature based kd trees. The search test was done by feeding one or more images of an object to the algorithm and retrieving the ID of the most similar object. If the ID of the most similar object in training data matches the object ID of input images, the search is counted as a correct search. The object recognition accuracy is computed by dividing the number of correct search results by the total number of searches.

The training dataset was composed by taking photos of every object in 30° interval (i.e. 0°, 30°, 60°, . . . , 330°) from ALOI. For better recognition accuracy, a smaller interval can be used at the cost of more memory space and larger kd trees. Following the training data collection, the SIFT features and sub-SIFT features were extracted from each photo and associated with the corresponding object ID. The test dataset was formed by taking photos with a 30° interval and 15° offset (i.e. 15°, 45°, 75°, . . . , 345°). Since the system has training images in a 30° viewing angle interval, a 15° viewing angle offset is the maximum offset a real camera can achieve during a capture. Therefore, the reported data will be close to the worst scenario case in a similar capture environment.

With the test dataset, 5 types of queries were composed. A type 1 query includes features from 1 image of an object. A type 2 query includes features from 2 images taken at opposite directions (e.g. (15°, 195°)). A type 3 query includes features from 3 images taken with 120° interval (e.g. (15°, 135°, 255°)). A type 4 query includes features from 4 images taken with 90° interval. A type 5 query includes features from 6 images taken with 60° interval.

The comparison is performed on a dual core Pentium 4 computer. For the k-nearest-neighbour search, k was set equal to 3. During the test, the algorithm used 50% of the CPU computation power. Because the time cost of an individual search may vary greatly due to the matching point position in a kd tree, the search time was averaged over a large number of queries for the comparison. The search time average was done over 12,000 one-image queries, 6,000 two-image queries etc. Because a regular exact kd tree search can take up a very long time (around 45223 ms/image), an Approximate Nearest Neighbour (ANN) approach was used for all the kd tree searches. The main idea of ANN is to find an approximate nearest neighbour within the radius that is $(1+\epsilon)$ times larger than the closest distance to another point. By setting the $\epsilon$ to 2.0, the average search time for one image query is improved from 45223 ms/image to 2204 ms/image. Thus, the embodiment of the invention the approximate nearest neighbour is determined about 20 times faster than the algorithm that finds the true nearest neighbour.

Figure 8:
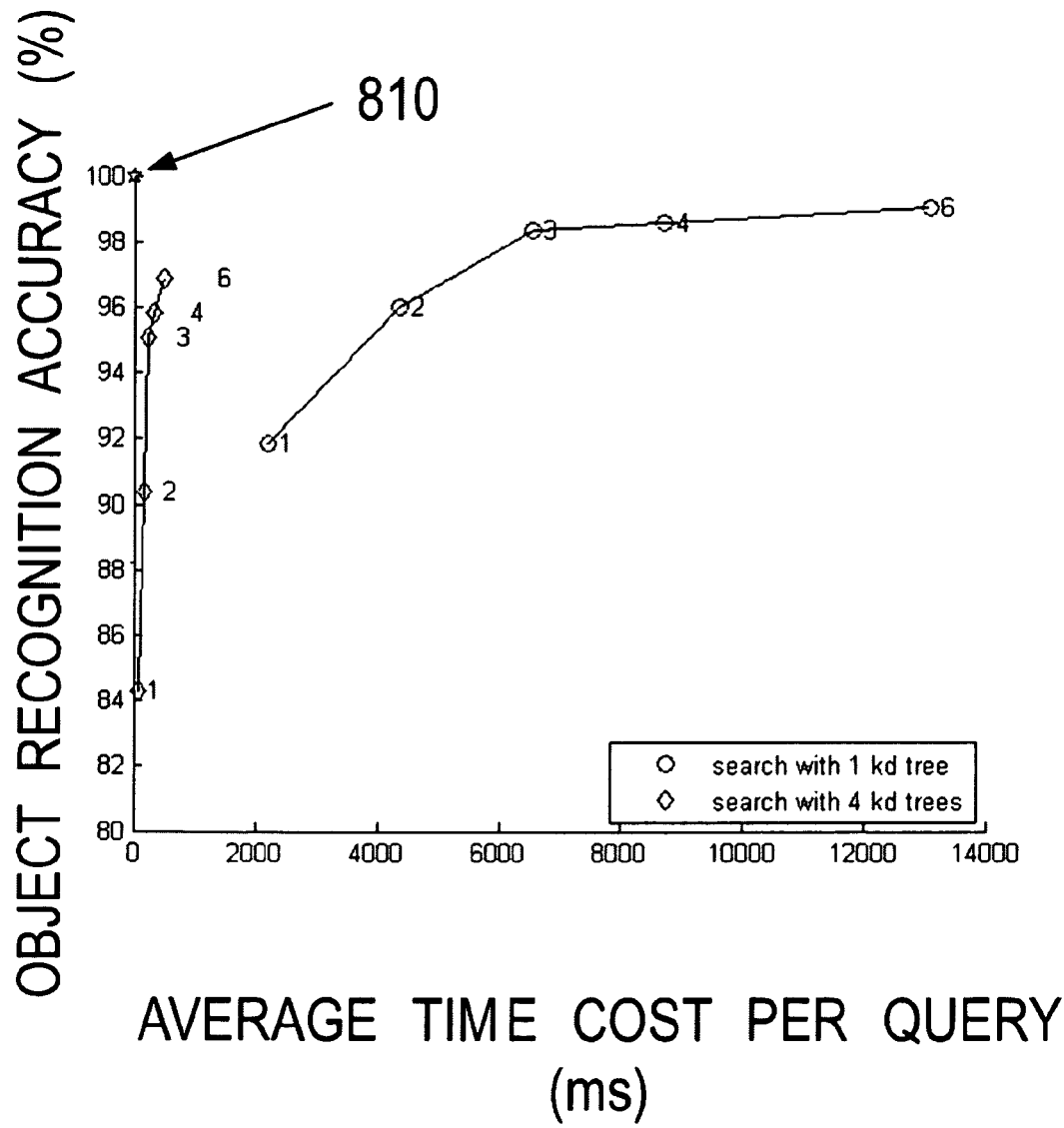
FIG. 8 shows a comparison between an embodiment of the invention and a traditional SIFT approach for the accuracy and average time cost per query.

FIG. 8 shows the results of the comparison, where the vertical axis reflects the object recognition accuracy and the horizontal axis reflects the average time cost. All 5 diamond marks are results obtained with an embodiment of the invention. All circle marks are results obtained with the combination of a prior art SIFT feature and a one kd tree search (which is equivalent to a nearest neighbor search). The number on the right of each mark in FIG. 8 corresponds to the number of images used in each query. In FIG. 8 the mark 810 represents the ideal position for all search algorithms (i.e., this point corresponds to achieving 100 percent recognition accuracy with no time cost).

Compared with one-tree based search, the embodiment of the invention has more results closer to the ideal position. Unexpectedly, for a similar object recognition accuracy (e.g., diamond 4 and circle 2), the embodiment of the invention uses about 1/13th of the time for a query. Based on this result, the time saving can become even larger with a larger data set. This unexpected result indicates that the embodiment of the invention is excellent for speeding up traditional SIFT based searches for object recognition.

Various embodiments of the invention can be implemented using a processor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits and/or by interconnecting an appropriate network of component circuits, as will be readily apparent to those skilled in the art.

Various embodiments include a computer program product which can be a storage medium (media) having instructions and/or information stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, micro drives, magneto-optical disks, holographic storage devices, ROMs, RAMs, EPROMs, EEPROMs, DRAMs, PRAMS, VRAMs, flash memory devices, magnetic or optical cards, nano-systems (including molecular memory ICs); paper or paper-based media; and any type of media or device suitable for storing instructions and/or information. Various embodiments include a computer program product that can be transmitted in whole or in parts and over one or more public and/or private networks wherein the transmission includes instructions and/or information, which can be used by one or more processors to perform any of the features, presented herein. In various embodiments, the transmission may include a plurality of separate transmissions.

Stored on one or more computer readable media, the present disclosure includes software for controlling the hardware of the processor(s), and for enabling the computer(s) and/or processor(s) to interact with a human user or other device utilizing the results of the present invention. Such software may include, but is not limited to, device drivers, interface drivers, operating systems, execution environments/ containers, user interfaces and applications.

The execution of code can be direct or indirect. The code can include compiled, interpreted and other types of languages. Unless otherwise limited by claim language, the execution and/or transmission of code and/or code segments for a function can include invocations or calls to other software or devices, local or remote, to do the function. The invocations or calls can include invocations or calls to library modules, device drivers, interface drivers and remote software to do the function. The invocations or calls can include invocations or calls in distributed and client/server systems.

Example embodiments of the methods, systems, and components of the present invention have been described herein. These example embodiments have been described for illustrative purposes only, and are not limiting. Other embodiments are possible and are covered by the invention. Such embodiments will be apparent to persons skilled in the relevant art(s) based on the teachings contained herein.

Thus, the breadth and scope of the present invention should not be limited by any of the above-described exemplary embodiments, but should be defined only in accordance with the following claims and their equivalents.

What is claimed is:

1. A method of searching for an electronic-document (e-document) from a library of documents, comprising the steps of:
    (a) obtaining a digital image of the e-document;
    (b) generating a plurality of descriptors based on the image;
    (c) generating a plurality of local sub-descriptors based on the descriptor;
    (d) finding the k approximate nearest neighbors of each sub-descriptor;
    (e) assigning a label to each sub-descriptor of each descriptor based on the closest k-approximate-nearest-neighbors of each sub-descriptor;
    (f) assigning a final label to the image based on the plurality of sub-descriptor labels; and
    (g) retrieving the e-document from the library of documents based on the final label assignment.

2. The method of claim 1, where in step (a) two or more images can be obtained such that in step (b) the plurality of descriptors is based on the two or more images.

3. The method of claim 1, where in step (b) an image-feature is used as one or more of the descriptors.

4. The method of claim 3, where in step (c) a 128-dimension image-feature is divided into four 32-dimension sub-descriptors.

5. The method of claim 1, where in step (c), several sub-descriptors share the same anchor point.

6. The method of claim 1, where in step (d) a kd-tree for every sub-descriptor is used to find the k-approximate-nearest-neighbors.

7. The method of claim 6, where in step (d) the nodes in the kd-tree are sub-descriptors and corresponding labels collected based on one or more training images.

8. The method of claim 1, where in step (e) the highest frequency label in all k labels will be the label assigned to the sub-descriptor.

9. The method of claim 1, where in step (e) a matching criteria is used to assign the label, wherein the matching criteria is k-approximate-nearest-neighbor voting.

10. A method of searching for an electronic-document (e-document) from a library of documents, comprising the steps of:
    (a) obtaining a digital image of the e-document;
    (b) generating a plurality of Scale Invariant Feature Transform (SIFT) image-features based on the image;
    (c) generating a plurality of local sub-features based on the SIFT features;
    (d) building a kd-tree for each of the plurality of local sub-features;
    (e) assigning a label to each local sub-feature of each SIFT feature based on the labels of k-approximate-nearest-neighbors of each local sub-feature;
    (f) assigning a final label based on the SIFT sub-feature labels; and
    (g) retrieving original or related e-documents from the library of documents based on the final label.

11. The method of claim 10, where a 128-dimension SIFT image-feature is divided into four 32-dimension sub-features.

12. The method of claim 10, where in step (d) the nodes in the kd-tree are sub-features and corresponding labels collected based on one or more training images.

13. The method of claim 10, where in step (e) the highest frequency label in all k labels will be the label assigned to the sub-feature.

14. The method of claim 10, where in step (e) a matching criteria is used to assign the label, wherein the matching criteria is k-approximate-nearest-neighbor voting.

15. The method of claim 10, where in step (f) the final label assigned to the image is based on the most frequent label of the plurality of sub-features.

16. Non-transitory computer readable storage medium storing one or more programs for execution by one or more processors of the computer system, the one or more programs including instructions for performing a search for an electronic-document (e-document) from a library of documents, comprising the steps of:
    (a) obtaining a digital image of the e-document;
    (b) generating a plurality of Scale Invariant Feature Transform (SIFT) image-features based on the image;
    (c) generating a plurality of local sub-features based on the SIFT features;
    (d) building a kd-tree for each of the plurality of local sub-features;
    (e) assigning a label to each local sub-feature of each SIFT feature based on the label of k-approximate-nearest-neighbors of each local sub-feature;
    (f) assigning a final label based on the SIFT sub-feature labels; and
    (g) retrieving original or related e-documents from the library of documents based on the final label.

17. The program of instructions of claim 16, where a 128-dimension SIFT image-feature is divided into four 32-dimension sub-features.

18. The program of instructions of claim 16, where in step (d) the nodes in the kd-tree are sub-features and corresponding labels collected based on one or more training images.

19. The program of instructions of claim 16, where in step (e) the highest frequency label in all k labels will be the label assigned to the sub-feature.

20. The program of instructions of claim 16, where in step (e) a matching criteria is used to assign the label, wherein the matching criteria is k-approximate-nearest-neighbor voting.

21. The program of instructions of claim 16, where in step (f) the final label assigned to the image is based on the most frequent label of the plurality of sub-features.

22. A system or apparatus for searching for an electronic-document (e-document) from a library of documents, comprising:
    one or more processors configured to specifying one or more sets of parameters, capable of transferring the one or more sets of parameters to a source code, configured to compiling the source code into a series of tasks for obtaining a digital image of the e-document, generating a plurality of Scale Invariant Feature Transform (SIFT) image-features based on the image, generating a plurality of local sub-features based on the SIFT features, building a kd-tree for each type of local sub-features, assigning a label to each local sub-feature of each SIFT feature based on the label of k-approximate-nearestneighbors of each local sub-feature, assigning a final label based on the SIFT sub-feature labels and retrieving original or related e-documents from the library of documents based on the final label; and a machine readable medium including operations stored thereon that when processed by one or more processors cause a system to perform the steps of obtaining an image of the e-document, generating a plurality of SIFT image-features based on the image, generating a plurality of local sub-features based on the SIFT features, building a kd-tree for each type of the plurality of local sub-features, assigning a label to each local sub-feature of each SIFT feature based on the label of k-approximate-nearest-neighbors of each local sub-feature, assigning a final label based on the SIFT sub-feature labels and retrieving original or related e-documents from the library of documents based on the final label.

* * * * *